Sept. 3, 1963
W. J. McKEEGAN
3,102,770
RECORDER INK SUPPLY
Filed Feb. 12, 1960
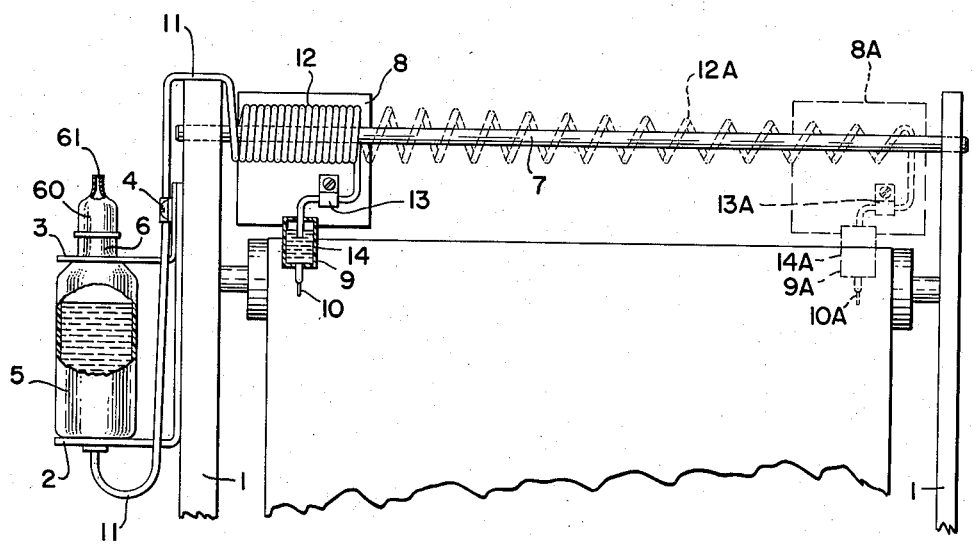
INVENTOR.
WARREN J. McKEEGAN
BY
ATTORNEY.

United States Patent Office 3,102,770
Patented Sept. 3, 1963

3,102,770
RECORDER INK SUPPLY
Warren J. McKeegan, Bala-Cynwyd, Pa., assignor to Minneapolis-Honeywell Regulator Company, Minneapolis, Minn., a corporation of Delaware
Filed Feb. 12, 1960, Ser. No. 8,327
8 Claims. (Cl. 346—140)

This invention relates to recorders which are of two types. Strip chart recorders are those in which the record-receiving medium is an endless belt or long strip of record-receiving material, such as paper, which is moved at a variable or uniform speed relative to a pen, which is moved at an angle to the direction of motion of the chart. Circular chart recorders are those in which the record-receiving medium is a disc, which is rotated at a uniform speed relative to the pen, which is moved generally radially of the chart.

This invention relates to means for conveying ink from a stationary bottle to a movable pen at a varying distance from the bottle.

More specifically, this invention relates to a bottle for ink, a flexible tube connected at one end to said bottle and wound in a coil, and a movable pen located above the level of the free surface of the ink in the bottle and connected to the opposite end of the tube from the bottle and adapted for movement across the chart.

Yet another object of this invention is to provide an ink supply system including a flexible tube and a pen having a reservoir for ink connected to it so that the tube may expand and contract without spilling the ink.

A better understanding of the present invention may be had from the following detailed description when read in connection with the accompanying drawing in which:

A single FIGURE of the drawing is a diagrammatic or schematic view in front elevation with the pen shown in full lines at one end of its path of travel and with the pen shown in dotted lines at the other end of its path of travel.

The recorder illustrated herein is of the strip chart type but might just as well be of the circular chart type.

The recorder of this invention comprises a rigid case having walls 1 on which the parts of the ink supply system are mounted. L-shaped brackets 2 and 3 are secured by a screw 4 to the case 1. A bottle 6 is mounted on brackets 2 and 3. Bottle 6 may be flexible in whole or in part, so that it can be compressed by the atmospheric pressure, or may be rigid. If a rigid bottle is employed, it has a top 60 with a perforation 61 leading there-through to atmosphere. A supply of ink 5 is contained within the bottle 6. The top level of the supply of ink 5 is below the level of the pen hereinafter mentioned.

Mounted on case 1 is a rod 7 which forms a guide or support for the pen carriage 8. Pen carriage 8 carries an ink reservoir 9 containing a supply of ink 14 which does not completely fill the ink reservoir 9. A perforated pen 10 leads from the bottom of the ink reservoir 9.

Means are provided for conducting the ink from the bottle 6 to pen 10. These means comprise a tube 11 connected at one end to the bottom of the bottle 6 and at the other end entering into but spaced above the bottom of the ink reservoir 9. In the drawing, the pen carriage 8 is shown in full lines at one end of its path of travel. The tube 11 has a portion 12 wound into a generally cylindrical helix around the rod 7 as an axis.

The tube 11 may conveniently be made of "Saran" which is the trade-mark given to a group of tough, flexible, thermo-plastics containing polymeric vinylidene. Tube 11 may conveniently be of 22 gage, i.e. of the following dimensions in inches, 0.030 internal diameter and 0.010 wall.

The pen carriage 8 and the pen 10 are moved by means such as an electric motor (not shown) which is responsive to the variable of which a record is to be made.

Variations in this variable will cause the pen-carriage 8 and the pen 10 to move from the position in which they are shown in full lines in the drawing to the opposite end of the scale at which position the pen-carriage and pen are shown in dotted lines and marked 8A and 10A, respectively.

Since the bottle 6 is below the level of the pen 10, the ink is conducted from the bottle 6 to the pen 10 by capillary attraction. Because of the air cushion above the level of the ink 14 in the ink reservoir 9, upon movement of the pen carriage 8 from one end of the scale toward the other, the change of volume of the tube 11 or the forces caused by the acceleration or deceleration of the pen carriage 8 do not cause the ink to spill or to be pumped from the pen 10.

What is claimed is:

1. In a recorder, a stationary ink bottle, a capillary tube looped intermediate its ends about an axis spaced from the bottle so as to be movable longitudinally along said axis, one end of said tube being fixed and communicating with said bottle and the other end of said tube being connected to an ink reservoir having a large capacity relative to the capacity of said tube, said reservoir containing a supply of ink having a free surface and a cushion of air above the free surface of the ink therein, a pen communicating with said ink reservoir below the level of the free surface of the ink therein and positioned over a chart and discharging ink from said reservoir to the chart, and means moving said pen along said axis in response to changes in a variable to be recorded.

2. In a recorder, a case, a stationary ink bottle mounted on said case, a capillary tube having a helical portion intermediate its ends and looped about an axis spaced from said bottle so as to be movable longitudinally along said axis, one end of said tube being fixed and communicating with said bottle and the other end of said tube communicating with an ink reservoir having a capacity greater than the capacity of said tube and providing a supply of ink having a free surface and a cushion of air above said free surface and located above the level of said ink bottle, a pen communicating with the bottom of said ink reservoir and positioned over a chart and discharging ink from said reservoir to said chart, and means for moving said pen along said axis in response to changes in a variable to be recorded.

3. In a recorder, a stationary ink bottle having at least a portion sufficiently flexible to be moved by atmospheric pressure, a flexible capillary tube having an intermediate helical portion looped around an axis located at a distance from said bottle so as to be movable longitudinally along said axis, one end of said tube being fixed and communicating with said bottle and the other end of said tube communicating with an ink reservoir having a capacity greater than the capacity of said tube, said reservoir containing a supply of ink having a free surface and a cushion of air above the free surface of the ink therein, a pen communicating with the bottom of said ink reservoir and positioned over a chart and discharging ink from said reservoir to said chart, and means for moving said pen along said axis in response to changes in a variable to be recorded.

4. In a recorder, a stationary ink bottle having a perforation through the wall thereof communicating with the atmosphere, a capillary tube having an intermediate helical portion looped around an axis spaced from said bottle and movable lengthwise of said axis, one end of said tube being fixed and communicating with said bottle and the other end of said tube communicating with an ink reservoir having a greater capacity than the cross-section of said tube, said reservoir containing a supply of ink having a free surface and a cushion of air above the free surface of the ink therein, a pen communicating with the bottom of said ink reservoir and positioned over a chart to discharge ink from said reservoir to the chart, and means for moving said pen along said axis in response to changes in a variable to be recorded.

5. In a strip chart recorder having a strip chart and means for moving it at a uniform speed, a case, a stationary ink bottle mounted on said case, a flexible capillary tube connected at one end to said bottle and having an intermediate extensible helical portion along its major axis, a rod located within the helical portion of said tube and providing a guide, a pen-carriage mounted for movement along said rod and having the other end of said tube attached thereto, an ink reservoir mounted on said pen carriage and having sufficient capacity to contain a supply of ink in it and an air space above the free surface of said ink, the other end of said tube communicating with said ink reservoir below the free surface of the ink therein, and a pen mounted on and communicating with the bottom of said ink reservoir and movable over the chart to make a record thereon.

6. In a recorder having a chart in it, a case, a stationary ink bottle mounted on said case, a capillary tube having a helical portion intermediate its ends and wound about an axis spaced from said bottle so as to be movable longitudinally along said axis, a pen communicating with one end of said tube and discharging ink from said tube to said chart, the other end of said tube being fixed and communicating with said bottle and means for moving said pen and the helical portion of said capillary tube along said axis in response to changes in a variable to be recorded.

7. In a strip chart recorder having a strip chart and means for moving it at a uniform speed, a case, a stationary ink bottle mounted on said case, a flexible capillary tube connected at one end to said bottle and having an intermediate extensible helical portion along its major axis, a rod located within the helical portion of said tube and providing a guide for said tube, a pen-carriage mounted for movement along said rod and having the other end of said tube attached thereto, and a pen mounted on said pen carriage and communicating with the end of said tube carried by said pen carriage and movable over the full extent of the chart to make a record thereon.

8. In a graphic communication system in which an electric signal representative of the instantaneous value of a process variable is transmitted to a recorder, a recorder, including in combination: a pen mounted for movement, in a given writing plane, over a predetermined writing area; means for moving said pen in said writing plane in response to said electric signal; a chart having a writing surface parallel to said writing plane and adapted to receive ink from said pen to make records on said chart; a stationary bottle having an apertured upper portion and adapted to contain a supply of ink under atmospheric pressure; a flexible capillary tube connected at one end to said bottle and having an intermediate, extensible, helical portion; a rod located within the helical portion of said tube and providing a guide for the longitudinal movement of the helical portion of said tube in response to movements of said pen; a pen-carriage mounted for movement along said rod and carrying said pen thereon; and an ink reservoir mounted on said pen-carriage and having sufficient capacity to contain a supply of ink in it and an air-space above the free surface of said ink, the other end of said tube communicating with said ink reservoir below the free surface of the ink therein.

References Cited in the file of this patent

UNITED STATES PATENTS

| | | |
|---|---|---|
| 1,307,195 | Gardner | June 17, 1919 |
| 1,849,084 | Hand | Mar. 15, 1932 |
| 2,724,631 | Ruhland | Nov. 22, 1955 |
| 2,866,474 | Gummere et al. | Dec. 30, 1958 |

FOREIGN PATENTS

| | | |
|---|---|---|
| 1,210,090 | France | Sept. 28, 1959 |